United States Patent
Schlaudraff

(10) Patent No.: US 12,443,025 B2
(45) Date of Patent: Oct. 14, 2025

(54) METHOD AND DEVICE FOR EXAMINING MICROSCOPE SPECIMENS USING OPTICAL MARKERS

(71) Applicant: LEICA MICROSYSTEMS CMS GMBH, Wetzlar (DE)

(72) Inventor: Falk Schlaudraff, Butzbach (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 634 days.

(21) Appl. No.: 17/909,451

(22) PCT Filed: Mar. 15, 2021

(86) PCT No.: PCT/EP2021/056547
§ 371 (c)(1),
(2) Date: Sep. 6, 2022

(87) PCT Pub. No.: WO2021/180982
PCT Pub. Date: Sep. 16, 2021

(65) Prior Publication Data
US 2023/0161146 A1 May 25, 2023

(30) Foreign Application Priority Data
Mar. 13, 2020 (DE) .............. 10 2020 203 290.4

(51) Int. Cl.
G02B 21/36 (2006.01)
G02B 21/00 (2006.01)
G06V 40/12 (2022.01)
G01N 35/00 (2006.01)

(52) U.S. Cl.
CPC ....... G02B 21/367 (2013.01); G02B 21/0004 (2013.01); G06V 40/12 (2022.01); G01N 2035/00821 (2013.01)

(58) Field of Classification Search
None
See application file for complete search history.

(56) References Cited

U.S. PATENT DOCUMENTS 4,807,979 A 2/1989 Saccomanno et al.
2018/0045641 A1 2/2018 Zeder

FOREIGN PATENT DOCUMENTS

DE 102014202860 A1 8/2015
WO WO 2013/011104 A1 1/2013

OTHER PUBLICATIONS

Gee, J.C., Reivich, M., Bajcsy, R., "Elastically deforming a three-dimensional atlas to match an atomical brain images," Oct. 1993, IRCS Technical Reports Series, 192, University of Pennsylvania, US, pp. 1-28.

(Continued)

Primary Examiner — Robert E. Tallman
(74) Attorney, Agent, or Firm — LEYDIG, VOIT & MAYER, LTD.

(57) ABSTRACT

A device for examining microscope specimens includes a microscope, wherein the microscope specimens include an object to be examined by the microscope and a specimen carrier holding the object, and wherein the device is configured to calculate a digital identification code of the microscope specimen by fingerprinting the microscope specimen using at least one optical marker in at least one digital image of at least a part of the object.

25 Claims, 1 Drawing Sheet

(56) References Cited

OTHER PUBLICATIONS

Rouchdy, Y. and Cohn, L., "A geodesic voting method for the segmentation of tubular tree and centerlines," 2011 IEEE International Symposium on Biomedical Imaging: From Nano to Macro, Mar. 20, 2011-Apr. 2, 2011, US, pp. 979-983.

Zhang, X. et al.: Towards large-scale histopathological image analysis: Hashing-based image retrieval. In: IEEE Transactions on Medical Imaging, vol. 34, No. 2, Feb. 2015, pp. 496-506, US.

Sapkota, M. et al.: Deep convolutional hashing for low-dimensional binary embedding of histopathological images. In: IEEE journal of biomedical and health informatics, vol. 23, No. 2, Mar. 2019, pp. 805-816, US.

Jeremy, G. et al.: Single-Molecule Imaging to Characterize the Transport Mechanism of the Nuclear Pore Complex. In: Chromosome Architecture. Humana Press, New York, NY, Jun. 2016, pp. 17-35.

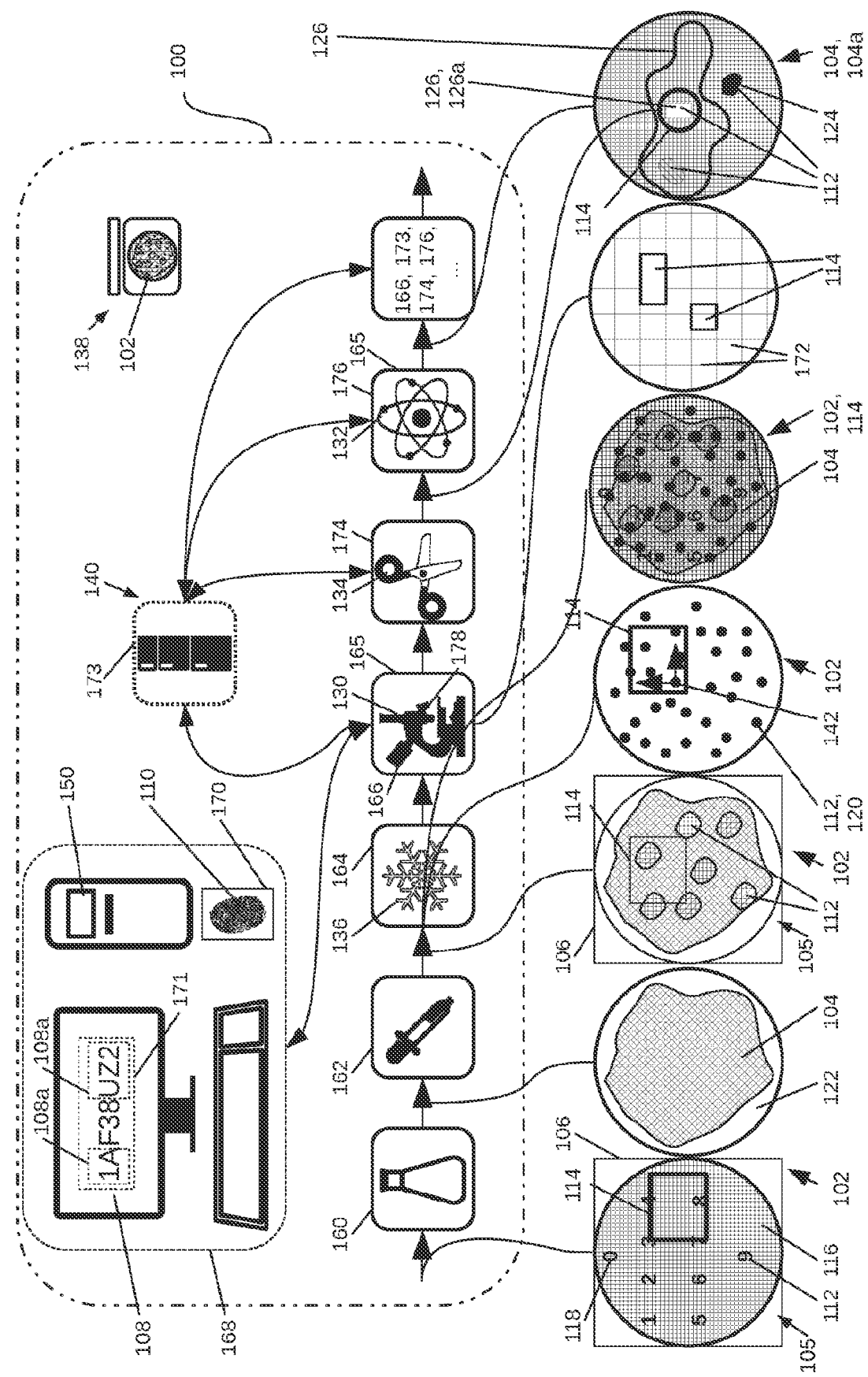

METHOD AND DEVICE FOR EXAMINING MICROSCOPE SPECIMENS USING OPTICAL MARKERS

CROSS REFERENCE TO RELATED APPLICATIONS

This application is a U.S. National Phase application under 35 U.S.C. § 371 of International Application No. PCT/EP2021/056547, filed on Mar. 15, 2021, and claims benefit to German Patent Application No. DE 10 2020 203 290.4, filed on Mar. 13, 2020. The International Application was published in German on Sep. 16, 2021, as WO 2021/180982 A1 under PCT Article 21 (2).

FIELD

The invention relates to a device and a method for examining microscope specimens.

SUMMARY

In an embodiment, the present disclosure provides a device for examining microscope specimens, comprising a microscope, wherein the microscope specimens include an object to be examined by the microscope and a specimen carrier holding the object, and wherein the device is configured to calculate a digital identification code of the microscope specimen by fingerprinting the microscope specimen using at least one optical marker in at least one digital image of at least a part of the object.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 1 shows a schematic illustration of a device according to the invention for carrying out the method according to the invention.

DETAILED DESCRIPTION

Embodiments of the present invention simplify the examination of microscope specimens, in particular when the microscope specimens are examined in a series of chronologically successive intervals, for example, by various microscopes.

Advantages of embodiments of the present invention are achieved, on the one hand, by a device for examining microscope specimens, wherein the microscope specimens include an object to be examined by a microscope and a specimen carrier holding the object and wherein the device is designed to calculate a digital identification code of the microscope specimen by fingerprinting the microscope specimen using at least one optical marker in at least one digital image of at least one part of the object.

Embodiments of the invention furthermore relate to a method, in particular a microscopy method, for microscope specimens, wherein the microscope specimens include an object to be examined by the microscope and a specimen carrier holding the object, wherein for at least one of the microscope specimens, a digital identification code is calculated using optical markers in at least one digital image of at least one part of the object by fingerprinting, thus by image processing, of the microscope specimen.

Due to the fingerprinting, it is possible to identify the microscope specimen or the object without using additional means, for example, barcodes. Because the fingerprinting represents a region occupied by the object in the digital image, the fingerprinting can be carried out during the examination of the microscope specimen without other regions of the specimen carrier outside the object or the region occupied by the object, in which, for example, an identification is printed, having to be examined beforehand. In addition, it is no longer necessary with this solution to scan the specimens, for example, by way of a separate barcode scanner in order to identify them. The identification takes place directly in the image of the object itself.

The digital identification code is generated as a fingerprint in the form of a hash value by means of fingerprinting. The fingerprint is the result of generally non-injective imaging, by a variance coefficient or hash function, of a large input amount to a smaller target amount, namely the hash values (cf. Wikipedia on fingerprint (hash function)). An at least nearly unique identification code of the object or its image is generated by the fingerprinting.

Due to these advantages, the device according to an embodiment of the invention and the method according to an embodiment of the invention are suitable in particular for refrigerated microscope specimens which are examined in the refrigerated state, since the identification of the microscope specimens is possible quickly and without additional devices.

The object is in particular a biological sample or a biological specimen, for example, a cell, a cell culture, and/or a section through biological tissue. The object can contain inorganic material or can consist thereof. The object can continuously cover a region of the specimen carrier or cover individual regions of the specimen carrier spaced apart from one another. The holding of the object also includes supporting, accommodating, or containing the object, of course.

Further advantageous embodiments of the device and the method are explained by way of example hereinafter. The individual embodiments are combinable independently of one another and exchangeable independently of one another. In particular, it is also possible that the device is designed to execute a feature indicated hereinafter as a method step. Vice versa, a functional suitability of the device can also represent a method step.

A digital image can thus be or represent an overview picture of the object. For example, the digital image can be generated or can have been generated by a slide scanner. Such a slide scanner is designed to digitize a plurality of biological objects on the specimen carriers in succession, preferably automatically. The specimen carrier or at least the region on which the object is located can be recorded by means of a low magnification. In particular, a digital image can be generated in transmitted light.

A digital image can also represent a detail of the object. Furthermore, a digital image can be a tile, wherein multiple tiles add up together to form a digital image of a larger region of the object.

The specimen carrier is preferably made of glass or another material transmissive to light and electron beams, so that the images can be generated using greatly varying electromagnetic radiation. The specimen carrier can also be manufactured from metal. According to a further embodiment, the specimen carrier can have a coating. For example, the specimen carrier can have a gold and/or carbon coating.

In the calculation of the digital identification code by means of fingerprinting, metadata which are not included in the image can also be taken into consideration. Thus, for example, table coordinates and/or items of distance information, a magnification, resolution, and/or a focal length underlying the image or its generation can be included in the digital identification code or linked thereto. Metadata which are included in the digital identification code reflect the hash value or fingerprint, which has a different value without these data or with other data.

According to an advantageous embodiment, the fingerprinting in particular comprises a recursive hash function.

The device for examining microscope specimens comprises hardware and/or software, for example, in the form of an image processor. The device can have a memory in which, for example, one or more identification codes and/or one or more images are stored. A digital identification code and/or an image can in particular be stored or become stored in a nonvolatile memory. The nonvolatile memory can be part of the device. Metadata which are linked to a digital identification code can also be stored in the memory.

The device can in particular be designed to identify the specimen carrier or the object by comparing the calculated digital identification code to a stored and/or (previously) calculated identification code or to calculate a digital identification code for a stored image by fingerprinting and to compare the two identification codes. The stored identification code can represent an image or can have been calculated on the basis of at least one image which has a different resolution, location, orientation, and/or enlargement than the at least one image for ascertaining the (previously) calculated identification code.

According to an advantageous embodiment, the specimen carrier can be provided with a predetermined, in particular regular pattern. The at least one optical marker can comprise at least one irregularity of the pattern represented in the image, in particular an irregularity located in the region of the object. The irregularity can also be generated artificially and intentionally, for example, by a laser microdissection system as described in DE 10 2014 202 860 A1.

The predetermined pattern is preferably present at least in the region of the object on the specimen carrier. The pattern can be a grid, for example. Such a grid can be manufactured from a metallic material, for example, can be applied to the specimen carrier.

The at least one optical marker can comprise at least one intentionally introduced or randomly occurring irregularity and/or damage of the predetermined pattern. Irregular marks, such as letters or numbers, can thus be introduced in the course of the manufacturing of the pattern at regular or irregular intervals of a grid. Such marks can also be used to determine the resolution, location, orientation, and/or enlargement of the digital image in which this optical marker is reproduced. Damage to the pattern or the grid and/or the irregular marks provided in addition to the pattern or grid are usually of a stochastic nature with respect to location and/or shape and can preferably be used for the fingerprinting.

An optical marker can also result from an overlap of the pattern, which is partial in particular, by the object.

The irregularity can also be part of the pattern. The pattern can thus, for example, represent a quasirandom code which codes the location. For example, the grid lines can be formed by a quasirandom sequence of long and short strokes or a quasirandom sequence of gaps and holes. A quasirandom code is a systematically constructed, uniformly distributed code sequence or number sequence.

In an advantageous embodiment, it can be provided that the microscope specimen, in particular the object, is and/or becomes provided with randomly distributed marker bodies, and the at least one optical marker comprises at least one marker body, preferably a plurality of marker bodies in the image. A marker body is a separate body with which the specimen is provided to generate optical markers. A diameter of a marker body can be between 1 nm and 1 mm, depending on the magnification of the object in the image. Their size and distribution density are preferably dimensioned so that a plurality of marker bodies is located in an image without structures to be examined being covered.

Such randomly or stochastically distributed marker bodies can be, for example, fiducial markers or fiducials. In particular, the marker bodies can be bead-shaped bodies. The marker bodies can be constructed from metal or a nonmetal to be reflective and/or fluorescent. The marker bodies can be applied in a separate method step by hand or automatically on the specimen carrier or the object.

The at least one optical marker can have a size in the range from outside one micrometer or multiple micrometers. Different markers can have different sizes.

The marker bodies and/or the at least one irregularity can be stochastically distributed over the image and the object. In an embodiment, the marker bodies and/or the at least one irregularity of the pattern can form a quasirandom distribution, however, which generates a unique code for each image detail. The image may be identified easily by fingerprinting by way of this quasirandom code. Moreover, such a quasirandom code permits the location and/or the orientation of the digital image to be uniquely located within the entire region of the microscope specimen occupied by the object.

The irregularity can be generated intentionally or unintentionally.

According to an embodiment, the at least one optical marker can comprise or represent an irregularity of a coating of the specimen carrier in the image. Such a coating can comprise, for example, a nutritional layer, a carbon layer, a membrane that can be cut by a laser, for example, by means of laser microdissection, for example, made of or containing PEN and/or PET, and/or a carbon membrane. An irregularity which is used as the at least one optical marker can in particular be a damage of the coating and/or a contamination of the object and/or a region of the object. One example of a contamination is, for example, an ice crystal or an icy point in a cryogenic sample.

The at least one optical marker can furthermore be a structure of the object represented in the image. Such a structure can be, for example, a cell component, an arrangement of multiple cell components, a distribution of multiple cells, a single cell, a tissue structure, and/or an arbitrary combination of these structures.

An optical marker can also be an icing structure of a frozen object, a structure made of ice, for example, one ice crystal or a plurality of ice crystals, and/or a processed region of the object. Such a processed region can be a lamella, a lift-out, or a cut-out or abraded region of the object.

A time of the creation of the at least one image can be contained or coded in the digital identification code. The time of the creation of the at least one image in particular permits an identification of the specimen upon the examination of microscope specimens in fixed successive steps with examination time spans each predefined in a narrow tolerance frame. A specimen can thus be identified as a function of a time difference between the creation of two images, in particular by different devices.

The different images can be recorded using different modalities, for example, visible and/or not visible light, fluorescent light, and/or electron beams. The different images can alternatively or additionally be recorded by means of different contrast and/or recording methods, for example, bright-field microscopy, dark-field microscopy, fluorescence microscopy, confocal microscopy including spinning disk, light sheet microscopy, multi-photon microscopy, high-resolution microscopy such as STED or localization microscopy, electron microscopy, and/or atomic force microscopy.

The device for examining the microscope specimen can be designed, for example, to create at least one image by way of a light microscope and/or at least one image by way of an electron microscope. The microscopy method can comprise the method step of creating at least one image by way of a light microscope and/or creating at least one image by way of an electron microscope and/or the atomic force microscope.

The device for examining the microscope specimen according to one of the above-described embodiments can have at least one device from the following list: at least one light microscope; at least one electron microscope; at least one atomic force microscope; at least one device for processing the object; at least one device for freezing the microscope specimen; at least one cryogenic container for at least one microscope specimen, at least one microtome; at least one micromanipulator; at least one laser microdissection unit; at least one set of optical tweezers; at least one high-pressure freezer; at least one grid plunger; at least one dry shipper, for example a dry shipping container and/or a nitrogen transport container.

The light microscope can be designed as a slide scanner, a high-resolution microscope such as a STED or a localization microscope, a stereo, phase difference, transmitted light, incident light, bright-field, dark-field, light sheet, laser microdissection, and/or confocal microscope including structural combinations of such microscopes. The device can also include multiple such light microscopes, also of different types, using which the microscope specimen is studied in succession.

The light microscope is designed in particular for examining frozen microscope specimens.

The electron microscope can be a scanning and/or transmissive electron microscope. The electron microscope can also preferably be designed for examining frozen microscope specimens.

The device for processing the object can be, for example, robot-controlled tweezers, a picker, a pipette, an ion beam ablator, and/or a dissection device, for example, a laser microdissection device.

The device for freezing the sample can be a separate device or can be integrated in a microscope.

The cryogenic container can have an integrated transfer unit for transferring the microscope specimen from the cryogenic container into the light microscope and/or electron microscope and/or the device for processing the object. The device for processing the object can be integrated in a light microscope and/or electron microscope.

The device for examining microscope specimens can be designed to create a plurality of different images of the microscope specimen. The microscopy method can comprise the method step of creating a plurality of different images of the microscope specimen. An identification code can be created for each of the different images separately, for a subset of the different images, and/or for the entirety of the images jointly, by fingerprinting in each case. The different identification codes of the different images can be combined jointly to form a higher-order identification code of the matching object.

The plurality of the different images for calculating an identification code is preferably generated in one step, in particular by a single device, for example, by a single light microscope or a single electron microscope. Alternatively or additionally, the plurality of the images can also be generated by different devices, for example, by one or more light microscopes and/or by one or more electron microscopes. Thus, for example, in each case one or more images can be generated in succession by different light, atomic force, and/or electron microscopes. A provided identification code which was calculated on the basis of one or more images of a microscope can be replaced or supplemented by an identification code which was calculated on the basis of one or more images of another microscope.

The individual images of the plurality of different images can have different color spaces and/or channels, a different color, magnification, and/or resolution. Each of the images can have a different color channel and/or a combination of different color channels. In particular, at least one image can be represented or generated in at least one section of a fluorescence spectrum of a fluorophore. The fluorophore is preferably part of the object. If multiple fluorophores are used simultaneously, multiple images can represent different fluorescence spectra of different fluorophores.

According to an embodiment, an image of the specimen can be disassembled into a plurality of tiles. A digital identification code can be calculated for each individual tile separately and/or for arbitrary combinations of tiles together in each case. The individual identification codes of the tiles can be combined to form a common identification code, for example, in the form of a blockchain.

Different images, also in different modalities, can be automatically registered using the optical markers. Thus, for example, the image of the electron microscope can automatically be enlarged by stretching, rotated, and/or distorted at least in regions and depending on direction in dependence on the image from the light microscope, so that both images are congruent. One example of an algorithm for such a registration is described in Gee, J. C.; Reivich, M.; Bajcsy, R.: "Elastically deforming a three-dimensional atlas to match an atomical brain images", 1993, IRCS Technical Reports Series, 192.

Examples for the identification of structures in an image are indicated, for example, in Rouchdy, Y.; Cohn, L.: "A geodesic voting method for the segmentation of tubular tree and center lines", 2011, DOI: 10.1109/ISBI.2011.5872566, 979 to 983 and in Suri, J.: "Angiography and plaque imaging: Advanced segmentation techniques", 2003, CRC Press.

The microscopy method in one of the above embodiments can moreover include the following method steps, preferably, but not necessarily, in the following sequence: processing the object, creating at least one image of the processed object, creating a new digital identification code and/or supplementing an existing digital identification code of the microscope specimen by fingerprinting of the at least one image of the processed object using optical markers in the at least one image, and/or replacing an existing digital identification code of the microscope specimen by fingerprinting the at least one image of the processed object using optical markers. In this way, it is possible in the event of changes of the object to calculate a new identification code and to supplement and/or replace an existing identification code. A new optical marker can thus be generated by the processing, for example, which can be used to further individualize the identification code. A plurality of identification codes of different images, for example, in the form of a blockchain, can be contained in the identification code of an object.

It is particularly advantageous if the at least one optical marker which is used to calculate a digital identification code is used at the same time as a position reference. The position reference can be assigned, for example, a unique location code on the specimen carrier, for example, in the form of coordinates. In this way, in particular in dependence on the magnification and/or resolution, the location of structures in relation to the at least one optical marker used as a position reference, and thus possibly an absolute position on the specimen carrier, may be determined easily and reliably.

The device can in particular have a processor, for example, a processor for image data processing, which can be constructed, for example, in the form of a CPU, GPU, a vector processor (VPU), an ASIC, an FPGA, and/or an arbitrary combination of such components including memories. The above-described method steps can be designed as hardware and/or software components.

In an embodiment, the invention accordingly also relates to a computer program product which comprises commands which, upon execution of the program by a computer, prompt it to carry out the method in one of the above-described embodiments.

Furthermore, an embodiment of the invention relates to a computer-readable data carrier on which the computer program product is stored.

In an embodiment, the invention furthermore relates to a digital identification code of an image of a microscope specimen, wherein the digital identification code is calculated by a device and/or a method in one of the above embodiments.

Finally, it is also possible to use machine learning, but in particular a neural network together with at least one microscope for calculating and possibly also identifying a digital identification code. A neural network is according to the invention when it is trained by the identification codes which are calculated by the method and/or the device in one of the above embodiments, and/or by different images.

Exemplary embodiments can be based on the use of a machine learning model or machine learning algorithm. Machine learning can relate to algorithms and statistical models which computer systems can use to execute a specific task without using explicit instructions, instead relying on models and interference. In machine learning, for example, instead of a rules-based transformation of data, a transformation of data can be used which can be derived from an analysis of profile and/or training data. For example, the content of images can be analyzed using a machine learning model or using a machine learning algorithm. In order that the machine learning model can analyze the content of an image, the machine learning model can be trained using training images as the input and training content information as the output. By training the machine learning model using a large number of training images and/or training sequences (for example, words or sentences) and assigned training content information (for example, identifiers or remarks), the machine learning model "learns" to recognize the content of the images, so that the content of images which are not included in the training data can be recognized using the machine learning model. The same principle can also be used for other types of sensor data: By training a machine learning model using training sensor data and a desired output, the machine learning model "learns" a conversion between the sensor data and the output, which can be used to provide an output based on non-training sensor data provided to the machine learning model. The provided data (e.g., sensor data, metadata, and/or image data) can be preprocessed to obtain a feature vector which is used as an input for the machine learning model.

Machine learning models can be trained using training input data. The examples listed above use a training method called "supervised learning". In supervised learning, the machine learning model is trained using a plurality of training sample values, wherein each sample value can comprise a plurality of input data values and a plurality of desired output values, i.e., each training sample value is assigned a desired output value. By specifying both training sample values and also desired output values, the machine learning model "learns" which output value is to be provided based on an input sample value which is similar to the sample value provided during the training. In addition to supervised learning, semi-supervised learning can also be used. In semi-supervised learning, some of the training sample values lack a desired output value. Supervised learning can be based on a supervised learning algorithm (e.g., a classification algorithm, a regression algorithm, or a similarity learning algorithm). Classification algorithms can be used when the outputs are restricted to a limited set of values (categorical variables), i.e., the input is to be classified as one from the limited set of values. Regression algorithms can be used when the outputs have any numeric value (within a range). Similarity learning algorithms can be similar to both classification algorithms and also regression algorithms, but are based on learning from examples using a similarity function which measures how similar or related two objects are. In addition to supervised learning or semi-supervised learning, unsupervised learning can be used to train the machine learning model. In unsupervised learning, possibly (only) input data are provided and an unsupervised learning algorithm can be used to find a structure in the input data (for example, by grouping or clustering the input data, finding similarities in the data). Clustering is the distribution of input data which comprise a plurality of input values into subsets (clusters), so that input values within the same cluster are similar according to one or more (predefined) similarity criteria, while input values which are comprised in other clusters are non-similar.

Reinforcing learning is a third group of machine learning algorithms. In other words, reinforcing learning can be used to train the machine learning model. In reinforcing learning, one or more so-called software agents are trained to perform actions in an environment. A reward is calculated based on the actions performed. Reinforcing learning is based on the training of the one or more software agents to select the actions in such a way that a cumulative reward is increased, which results in software agents which become better in the task given to them (as proven by increasing rewards).

Furthermore, several technologies can be applied to some of the machine learning algorithms. For example, feature learning can be used. In other words, the machine learning model can be trained at least partially using feature learning, and/or the machine learning algorithm can comprise a feature learning component. Feature learning algorithms, which are called representation learning algorithms, can receive the information in their input, but transform it in such a way that it becomes useful, also known as a preprocessing step before the execution of the classification or the prediction. Feature learning can be based, for example, on a main component analysis or cluster analysis.

In some examples, an anomaly detection (i.e., outlier detection) can be used, which is intended to provide an identification of input values which arouse suspicion, since they differ significantly from the majority of input and training data. In other words, the machine learning model can be trained at least partially using anomaly detection, and/or the machine learning algorithm can comprise an anomaly detection component.

In some examples, the machine learning algorithm can use a decision tree as a prediction model. In other words, the machine learning model can be based on a decision tree. In a decision tree, the observations of a subject (for example, a set of input values) can be represented by the branches of the decision tree, and an output value, which corresponds to the subject, can be represented by the leaves of the decision tree. Decision trees can support both discrete values and also progressive values as output values. If discrete values are used, the decision tree can be referred to as a classification tree, if progressive values are used, the decision tree can be referred to as a regression tree.

Association rules are a further technology which can be used in machine learning algorithms. In other words, the machine learning model can be based on one or more association rules. Association rules are created in that relationships between variables and large amounts of data are identified. The machine learning algorithm can identify and/or use one or more relationship rules which represent the knowledge derived from the data. The rules can be used, for example, to store, manipulate, or apply the knowledge.

Machine learning algorithms are normally based on a machine learning model. In other words, the term "machine learning algorithm" can refer to a set of instructions which can be used to create, train, or use a machine learning model. The term "machine learning model" can refer to a data structure and/or a set of rules which represent the learned knowledge (for example, based on the training executed by the machine learning algorithm). In exemplary embodiments, the use of a machine learning algorithm can imply the use of an underlying machine learning model (or a plurality of underlying machine learning models). The use of a machine learning model can imply that the machine learning model and/or the data structure/the set of rules which the machine learning model is/are is trained by a machine learning algorithm.

For example, the machine learning model can be an artificial neural network (ANN). ANNs are systems which are inspired by biological neural networks as are found in a retina or brain. ANNs comprise a plurality of interconnected nodes and a plurality of connections, so-called edges, between the nodes. There are normally three types of nodes, input nodes, which receive input values, concealed nodes, which are (only) connected to other nodes, and output nodes, which provide output values. Each node can represent an artificial neuron. Each edge can send information from one node to another. The output of a node can be defined as a (nonlinear) function of the inputs (for example, the total of its inputs). The inputs of a node can be used in the function based on a "weight" of the edge or the node, which provides the input. The weight of nodes and/or of edges can be adjusted in the learning process. In other words, the training of an artificial neural network can comprise an adjustment of the weights of the nodes and/or edges of the artificial neural network, i.e., to achieve a desired output for a specific input.

Alternatively, the machine learning model can be a support vector machine, a random forest model, or a gradient boosting model. Support vector machines (i.e., support vector networks) are supervised learning models having assigned learning algorithms which can be used to analyze data (for example, in a classification or regression analysis). Support vector machines can be trained by providing an input having a plurality of training input values which belong to one of two categories. The support vector machine can be trained to assign a new input value to one of the two categories. Alternatively, the machine learning model can be a Bayesian network which is a probabilistically directed acyclic graphic model. A Bayesian network can represent a set of random variables and their conditional dependencies using a directed acyclic graph. Alternatively, the machine learning model can be based on a genetic algorithm which is a search algorithm and heuristic technology that imitates the process of natural selection.

Embodiments of the invention are described in more detail by way of example hereinafter on the basis of an exemplary embodiment. According to the above statements, features of the exemplary embodiment can be omitted here if the technical effect linked to these features should not be important in a specific application. Vice versa, further features can also be added to the exemplary embodiment if their technical effect should be important in a specific application.

The same reference signs are used hereinafter for features which correspond to one another with respect to function and/or spatial-physical design.

The device 100 is used to examine a microscope specimen 102. The device 100 can be a system which includes one or more partial systems, as explained in more detail below.

The microscope specimen 102 includes a region 105 covered by an object 104 or designed to accommodate an object 104. The region 105 is part of a specimen carrier 106.

The object 104 is preferably a biological object, for example, a part of an organism prepared for microscopy, for example, a tissue section, or single cells. However, the object can also be inorganic and/or have inorganic components or can consist thereof.

The specimen carrier 106 is preferably manufactured from an optically transparent material, which is more preferably in addition transparent to electron beams. In particular, the specimen carrier 106 can be manufactured from glass or metal. The specimen carrier 106 holds the object 104. The object 104 thus rests on the specimen carrier 106, is accommodated, enclosed, and/or contained therein.

The device 100 is initially used to calculate a digital identification code 108 on the basis of the object 104 and/or the region 105 designed to accommodate the object. The calculation is carried out by means of fingerprinting 110. The fingerprinting 110, which is only shown schematically in FIG. 1, is a hardware-implemented and/or software-implemented algorithm which maps a data set of arbitrary size in a shorter bit sequence or number sequence, the so-called fingerprint. The fingerprint identifies the original data set uniquely or at least nearly uniquely. Fingerprinting algorithms are freely available, for example, in the American National Software Reference Library and the hash keeper database.

The fingerprinting 110 of the object 104 or region 105 or of details of this region 105 uses optical markers 112 in the digital image 114 of the region 105 or one or more details of the region 105.

The image 114 is a digital representation of at least a part of the region 105 and/or the object 104. For example, image data, which form a digital image, are such a digital representation. The digital image can be a black-and-white image, a grayscale image, and/or a color image. The digital image can have one or more color channels.

The creation of a fingerprint can be simplified if the microscope specimen 102, in particular the specimen carrier 106, is provided with a regular or irregular pattern 116. Such a pattern can be, for example, a grid or a grid structure. The grid can be generated, for example, by applying a metal layer on the specimen carrier 106 or the region 105.

The optical marker 112 in the image 114 is then preferably an irregularity 118 of the pattern 116. The pattern can thus be provided, for example, with predetermined irregularities 118, for example, irregular markings, such as letters and/or numbers. The irregularity 118 can be generated intentionally or unintentionally. An irregularity 118 can be, for example, a damage of the pattern 116 and/or a contamination in the region 105. It is additionally or alternatively also possible that the pattern 116 has a quasirandom component, for example, a quasirandom code.

An optical marker 112, as is used for the fingerprinting 110, can also be generated by one or more marker bodies 120 which are distributed stochastically over the region 105. The marker bodies can be introduced, scattered, and/or sprayed on. Such marker bodies or fiducials can have, for example, diameters in the range of a few micrometers or of fractions of micrometers. They can be fluorescent in particular.

The region 105 can be at least partially provided with a coating 122. The coating 122 can be, for example, a nutritional layer or a carbon layer, for example, a carbon membrane. Alternatively or additionally, the specimen carrier 106 can be coated using gold. One or more irregularities 118 in the coating 122 can be used as optical markers 112, for example, one or more damages.

If the object 104 is deep frozen, the image of an icing structure 124 can thus also be used as an irregularity 118. An icing structure 124 can be, for example, a single ice crystal, a collection of multiple ice crystals, or an iced region.

Finally, a structure 126 of the object 104 can also be used as an optical marker 112, for example, a tissue structure or a cell structure. The structure 126, like the other optical markers 112 as well, can be recorded using an electron beam, in white light, and/or in fluorescent light.

The device 100 can have a light microscope 130 and/or an electron microscope 132 for generating the digital image 114.

The light microscope 130 can be a slide scanner, a high-resolution microscope such as a STED microscope or a localization microscope, a stereo, phase difference, brightfield, dark-field, fluorescence, incident light, transmitted light, light sheet, and/or confocal microscope. The device 100 can have multiple light microscopes 130 in the same or in different embodiments.

The electron microscope 132 can be a scanning and/or a transmissive electron microscope. The device 100 can have one or more electron microscopes of the same or different design. Alternatively or additionally to the electron microscope, an atomic force microscope can be used or can be comprised by the device 100.

Both the at least one light microscope 130 and the at least one electron microscope 132 are preferably designed for examining frozen microscope specimens, so-called cryogenic specimens. For this purpose, the at least one light or electron microscope 130, 132 can have a region for accommodating the specimen carrier, which is refrigerated and/or thermally insulated.

The device 100 can furthermore have at least one device 134 for processing the object 104. Such a device 134 is, for example, robot-controlled tweezers, a picker, a pipette, a microtome, a micromanipulator, optical tweezers, an ion beam ablator, and/or a dissection device, for example, a device for laser microdissection, or a combination thereof.

For the case in which cryogenic samples are to be examined using the device 100, at least one device 136 for freezing the microscope specimen 102 can be provided. Such a device 136 can be, for example, a refrigerator 140, a high-pressure freezer, and/or a grid plunger. The device 136 can be integrated in a microscope 130, 132.

Finally, it is advantageous if the device 100 has at least one cryogenic container 138, which is designed to accommodate at least one microscope specimen 102. The cryogenic container 138 can be used to transport the microscope specimen 102 between various microscopes 130, 132, which can also be located in separate buildings or different cities. The cryogenic container 138 can have an integrated transfer unit which is designed to transfer a microscope specimen 102 from the cryogenic container 138 into a microscope 130, 132, a device 134, and/or a device 136. The transfer can in particular take place in a motorized and/or automatic manner. The cryogenic container can be designed to actively refrigerate the microscope specimen 102 and/or accommodate it in a thermally insulated or passively cooled manner. The cryogenic container 138 can also be, for example, a dry shipping container or a nitrogen transport container.

The at least one optical marker 112, which is used for calculating the digital identification code 108, can be used simultaneously as a position reference 142. For example, a microscope 130, 132 can be designed to position the specimen carrier 106 automatically in dependence on an optical marker 112 used as a position reference 142.

One or more markers 112 can be representative of a location and alignment of the region 105. For example, the resolution, orientation, magnification, and/or location of an image 114 can be determined via the location of two optical markers or the size and orientation of an irregularly formed optical marker. For example, an absolute position on the specimen carrier 106 or within the region 105 can be assigned to each optical marker 112. An orientation and magnification of a detail of the object 104 or the region 105 represented in an image 114 then results due to the relative position of two optical markers 112 in the image 114. The position of the optical marker 112 can be contained in the identification code 108 based on this marker, in particular in coded form. This also applies for the positions of multiple markers 112.

A neural network 150 can also be used to ascertain the digital identification code 108, which is designed to carry out the fingerprinting. The neural network 150 can be designed as software, hardware, or as a combination of hardware and software.

The function of the device 100 is as follows: In a step 160, the microscope specimen can initially be prepared. This takes place manually, for example, in that a tissue section is produced or cell cultures are raised. At the end of step 160, the region 105 is at least partially covered with the object 104.

In a step 162, the object 104 can then be further prepared, for example, by adding chemical substances. In step 162, the object can be prepared, for example, for specific examinations. One or more fluorophores can thus be applied if the object 104 is examined in fluorescent light. Optical markers, such as the marker bodies 112, can be added to the object 104 to generate optical markers 112 for the fingerprinting 110 and/or as reference positions for the positioning of the object. Furthermore, contrast agents can be added. Step 162 can be repeated multiple times and/or can take place for the first time at a later time. Thus, for example, a fluorophore can first be added at a later time when it is certain that the object is to be examined in fluorescent light.

If cryogenic specimens are examined, in a step 164, the specimen carrier with the object can be frozen, for example, by means of the device 136 for freezing. The specimen carrier 106 can be located in the cryogenic container 138 or can be inserted into the cryogenic container 138 after the freezing.

In a step 165, an image 114 representing an overview picture of the object 104 is initially preferably generated by a light microscope 130. In addition, further images 114, for example, individual overlapping sections of the object or magnified sections of the object spaced apart from one another can be generated. The light microscope is provided with at least one camera 166 for generating the at least one image 114.

On the basis of at least one image 114, preferably on the basis of a plurality of images 114, the digital identification code 108 of the object 104 or of the specimen carrier 106 carrying the object 104 is then calculated by fingerprinting 110. The calculation takes place in a data processing system 168, for example, a PC.

The calculation of the identification code 108 takes place in step 170.

In this case, as already mentioned, a plurality of different images 114 of the microscope specimens can be created to generate the identification code 108 from this plurality. The identification codes 108a of the different images 114 can be contained in the identification code 108, for example, in the form of a blockchain 171. The individual images 114 can have a different magnification and/or resolution here. The images 114 can have been recorded in different color channels and different color spaces. Furthermore, the images 114 can represent different regions of the region 105 and/or the object 104. The identification code 108 can be calculated by applying a hash function to an image, a subset of the plurality of the images 114, or all images 114.

An image 114 of the object 104 or the region 105 can also be divided into a plurality of tiles 172 to calculate the digital identification code 108. This division can be carried out in the course of the fingerprinting 110 by the data processing system 168.

After the digital identification code 108 of the object 104 or the specimen carrier 106 has been calculated in step 170, the specimen carrier 106 can initially be stored for a later examination, for example, in a refrigerator 140.

During step 170, a first examination of the object 104 can moreover be carried out, for example, as to whether it is suitable for the intended examination, or to define regions of the object which have to be examined in more detail in following steps.

An image 114 which represents such a region can also receive a separate digital identification code 108a by fingerprinting 110, which is combined with the identification code of the image 114 representing the overview picture to form a common identification code. Such a combined identification code 108 can be generated using arbitrarily many images 114. The entire identification code 108 then represents the identification code 108 for the complete object. It is then sufficient for identification of the object 104 if the identification code which is recorded on the basis of an image 114 of the object 104 recorded later is retrieved in the identification code 108 of the entire object 104.

To enable this, only those optical markers 112 are used for the calculation of the identification code 108 which are also retained in an image 114 of the object 104 generated later, which differs in location, orientation, magnification, resolution, and/or modality from the at least one image 114, on the basis of which the identification code 108 was calculated. Such optical markers 112 are the above-mentioned irregularities 118. Each image 114 which is newly created from the object 104 or the region 105 can be used to calculate a new identification code 108, which is added to the existing identification code 108.

As soon as an identification code 108 of the object 104 or the microscope specimen is calculated, the specimen can be stored in a step 173.

If an identification code 108 has been calculated on the basis of the at least one image 114, the object 104 can thus be processed in a step 174, for example, by a device 134. The object 104 can subsequently again be examined by a light microscope 130, or also by another modality, for example, by an electron microscope 132. The examination by another modality 132 or another type of light microscope 130 can also take place immediately after the step 166, without a processing 174 of the object 104 taking place in between. In such a case, the processing 174 can also only take place after step 176.

On the basis of the identification code 108, the object 104 may also be identified in an image 114 which was generated in another modality, for example by the electron microscope 132. An identification code 108 or 108a may be calculated here on the basis of each image 114, which is added to the already provided identification code 108 or replaces the already provided identification code 108 or parts 108a thereof.

If, for example, a region 126a of the object 104 is processed, by punching out, ablation, or production of a lamella, an identification code 108 of an image 114 which contains the processed region 126a is thus no longer up to date. If the processed region 126a is small, the contribution of the processed region to the identification code 108, which was generated on the basis of an overview picture or an image 114 representing a larger region, is not large enough under certain circumstances to change the identification code 108 of the entire object 104. However, if the processed region 126a in an image 114 is no longer small, the identification code 108, 108a of this image can thus be updated or replaced by a new identification code 108, 108a, in which the processed region 126a is taken into consideration. The processed region 126a can itself be used as an optical marker 112 here.

The identification code 108, 108a, if it is calculated quickly, can also be used for correlation and for automatic registration of images 114. Instead of the calculation of a correlation function, for example, identification codes 108, 108a can be calculated in an overview picture for continuously changing sections and compared to a previously calculated identification code 108, 108a of a region determined as interesting. If the currently calculated identification code 108, 108a corresponds to the previously calculated identification code 108, 108a or only minor deviations result, the sections thus correspond. The registration can be facilitated if the positions of the optical markers are contained in the identification codes 108, 108a based on these markers 112.

After the calculation of a first identification code 108 of an object 104, steps 166, 173, 174, 176 can be carried out in arbitrary sequence, at arbitrary time intervals, also multiple times in succession using the same object 104.

The identification code 108 permits the object 104 to be identified by creating the image 114, which is used simultaneously to examine the object 104. At the same time, the identification code 108 can be used to identify partial regions of the object 104 or the region 105. Such partial regions can be predetermined, for example, for processing 174 or for examination using another type of light microscope 130 or electron microscope 132.

To keep the processing power low in the calculation of the identification code 108, the image 114 is preferably optically or electronically filtered before the calculation of the identification code 108. The filter 178 applied here suppresses components in the image 114 which do not represent optical markers 112. Thus, for example, marker bodies 120 can be used which only have a narrow reflection and/or fluorescence spectrum. The filter 178 can be designed in such a case as a bandpass filter, the passband of which is restricted to a part of this reflection and/or fluorescence spectrum. Furthermore, the filter 178 can contain a pattern recognition which amplifies specific patterns in the image 114, which are used as optical markers, for example, numbers, letters, and/or specific geometric figures, and suppresses markers deviating therefrom. The filter 178 can be adapted to the different modalities. If fluorescent bead bodies 142 are used, for example, in an optical examination, a passband filter can thus be used to filter out the fluorescence spectrum of the marker body 120, while a pattern-sensitive filter, in which the geometry of the marker bodies 120 is taken into consideration, is used in an image generated by an electron microscope 132.

Several exemplary embodiments relate to a microscope 130, 132, which comprises a system as described in conjunction with FIG. 1. Alternatively, a microscope can be part of a system as described in conjunction with FIG. 1 or can be connected thereto. FIG. 1 shows a schematic illustration of a system 100 designed to execute a method described herein. The system 100 comprises a microscope 130, 132 and a computer system 160. The microscope 130, 132 is designed to record images and is connected to the computer system 160. The computer system 160 is designed to execute at least a part of a method described herein. The computer system 160 can be designed to execute a machine learning algorithm. The computer system 160 and the microscope 130, 132 can be separate units, but can also be integrated together in a common housing. The computer system 160 could be part of a central processing system of the microscope 130, 132 and/or the computer system 160 could be part of a subcomponent of the microscope 130, 132, such as a sensor, an actuator, a camera, or a lighting unit, etc., of the microscope 130, 132.

The computer system 160 can be a local computer device (e.g., personal computer, laptop, tablet computer, or mobile telephone) having one or more processors and one or more storage devices or can be a distributed computer system (e.g., a cloud computing system having one or more processors or one or more storage devices which are distributed at various points, for example, at a local client and/or one or more remote server farms and/or data centers). The computer system 160 can comprise any circuit or combination of circuits. In one exemplary embodiment, the computer system 160 can comprise one or more processors which can be of any type. According to present use, a processor can mean any type of processing circuit, for example, but not restricted to, a microprocessor, a microcontroller, a microprocessor with complex instruction set (CISC), a microprocessor with reduced instruction set (RISC), a very long instruction word (VLIW) microprocessor, a graphics processor, a digital signal processor (DSP), a multicore processor, a field-programmable gate array (FPGA), for example, of a microscope or a microscope component (for example, camera or sensor) or any other type of processor or processing circuit. Other types of circuits which can be comprised in the computer system 160 can be a specially manufactured circuit, an application-specific integrated circuit (ASIC) or the like, for example, one or more circuits (for example a communication circuit) for use in wireless devices, e.g., mobile telephones, tablet computers, laptop computers, walkie-talkies, and similar electronic systems. The computer system 160 can comprise one or more storage devices which can comprise one or more storage elements which are suitable for the respective application, for example, a main memory in the form of a read-only memory (ROM), one or more hard drives, and/or one or more disk drives which handle removable media, for example, CDs, flash memory cards, DVDs, and the like. The computer system 160 can also comprise a display device, one or more loudspeakers, and a keyboard and/or controller which can comprise a mouse, trackball, touchscreen, voice recognition device, or any other device which permits a system user to input information into the computer system 160 and receive information therefrom.

Some or all method steps can be executed by (or using) a hardware device which can be, for example, a processor, a microprocessor, a programmable computer, or an electronic circuit. In some exemplary embodiments, one or more of the most important method steps can be executed by such a device.

Depending on specific implementation requirements, exemplary embodiments of the invention can be implemented in hardware or software. The implementation can be carried out using a nonvolatile storage medium such as a digital storage medium, for example, a diskette, a DVD, a Blu-ray, a CD, a ROM, a PROM and EPROM, an EEPROM, or a FLASH memory, on which electronically readable control signals are stored which interact (or can interact) with a programmable computer system so that the respective method is carried out. The digital storage medium can therefore be computer readable.

Several exemplary embodiments according to the invention comprise a data carrier having electronically readable control signals which can interact with a programmable computer system so that one of the methods described herein is carried out.

In general, exemplary embodiments of the present invention can be implemented as a computer program product having a program code, wherein the program code acts to execute one of the methods when the computer program product runs on a computer. The program code can be stored, for example, on a machine-readable carrier.

Further exemplary embodiments comprise the computer program for carrying out one of the methods described herein, which is stored on a machine-readable carrier.

In other words, one exemplary embodiment of the present invention is therefore a computer program having a program code for carrying out one of the methods described herein when the computer program runs on a computer.

A further exemplary embodiment of the present invention is therefore a storage medium (or a data carrier or a computer-readable medium) which comprises a computer program stored thereon for executing one of the methods described herein when it is executed by a processor. The data carrier, the digital storage medium, or the recorded medium are generally tangible and/or not seamless. A further exemplary embodiment of the present invention is a device as described herein which comprises a processor and the storage medium.

A further exemplary embodiment of the invention is therefore a data stream or a signal sequence which represents the computer program for carrying out one of the methods described herein. The data stream or the signal sequence can be configured, for example, to be transferred via a data communication connection, for example, via the Internet.

A further exemplary embodiment comprises a processing means, for example, a computer or a programmable logic device, which is configured or adapted to execute one of the methods described herein.

A further exemplary embodiment comprises a computer on which the computer program for executing one of the methods described herein is installed.

A further exemplary embodiment according to the invention comprises a device or a system which is configured to transfer (for example electronically or optically) to a receiver a computer program for executing one of the methods described herein. The receiver can be, for example, a computer, a mobile device, a storage device, or the like. The device or the system can comprise, for example, a file server for transferring the computer program to the receiver.

In some exemplary embodiments, a programmable logic device (for example, a field-programmable gate array (FPGA)) can be used to execute some or all functionalities of the methods described herein. In some exemplary embodiments, a field-programmable gate array can cooperate with a microprocessor to carry out one of the methods described herein. In general, the methods are preferably carried out by each hardware device.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS 100 device
102 microscope specimen
104 object
104a processed object
105 region of the specimen carrier designed to accommodate the object or accommodating the object
106 specimen carrier
108 identification code
108a part of the identification code
110 fingerprinting
112 optical marker
114 image
116 pattern
118 irregularity
120 marker body
122 coating
124 icing structure
126 structure of the object
126a processed region of the object
130 light microscope
132 electron microscope
134 device for processing the object
136 device for freezing the object
138 cryogenic container
140 refrigerator
142 position reference
150 neural network
160 preparing the sample
162 dissecting the sample
164 freezing the sample
165 generating an image
166 camera
168 data processing system
170 calculating the identification code
171 blockchain
172 tile
173 storing the sample
174 processing the object
176 examining the object by means of an electron microscope
178 filter

The invention claimed is:

1. A device for examining microscope specimens, comprising a microscope,
   wherein the microscope specimens include an object to be examined by the microscope and a specimen carrier holding the object, and
   wherein the device is configured to calculate a digital identification code of the microscope specimen by fingerprinting the microscope specimen using at least one optical marker in at least one digital image of at least a part of the object.

2. The device as claimed in claim 1, wherein the specimen carrier is provided with a predetermined pattern and the at least one optical marker comprises at least one irregularity of the pattern in the image.

3. The device as claimed in claim 2, wherein the pattern represents a quasirandom code that codes a location.

4. The device as claimed in claim 1, wherein the microscope specimen is provided with randomly distributed marker bodies and the at least one optical marker comprises at least one marker body in the image.

5. The device as claimed in claim 1, wherein the at least one optical marker comprises an irregularity of a coating of the specimen carrier in the image.

6. The device as claimed in claim 1, wherein the at least one optical marker is a structure of the object in the image.

7. The device as claimed in claim 1, wherein the device comprises at least one of: a light microscope, an electron microscope a processing device for processing the object, a freezing device for freezing the microscope specimen, and/or a cryogenic container for at least one microscope specimen.

8. The device as claimed in claim 1, wherein the device is configured to:
create a plurality of different images of the microscope specimen and an identification code for each of the different images separately, for a subset of the different images, and/or for the entirety of the images jointly by fingerprinting, and
create the plurality of images by way of different devices, wherein the different devices comprise one or more light microscopes and/or one or more electron microscopes.

9. The device as claimed in claim 8, wherein the device is configured to combine the identification codes of the different images to form a higher-order identification code of the object.

10. The device as claimed in claim 1, wherein the device is configured to identify the object by comparing the calculated digital identification code to a previously calculated identification code of a further image, which has a different contrast and/or recording method, different color spaces or channels, a different modality, resolution, location, orientation, and/or magnification than the at least one image to ascertain the calculated identification code.

11. The device as claimed in claim 1, wherein the device is configured to disassemble the image into a plurality of tiles and to calculate an identification code for each individual tile separately and/or combinations of tiles together in each case.

12. The device as claimed in claim 11, wherein the device is configured to combine the individual identification codes of the tiles to form a joint identification code.

13. The device as claimed in claim 1, wherein a time of the creation of the at least one image is contained in the identification code.

14. The device as claimed in claim 1, wherein the device is configured to take into consideration metadata, which are not contained in the image, in the calculation of the digital identification code.

15. The device as claimed in claim 1, wherein the identification code of the object contains a plurality of identification codes of different images of the object in the form of a blockchain.

16. A microscopy method for microscope specimens, wherein the microscope specimens include an object to be examined by a microscope and a specimen carrier holding the object, the method comprising calculating a digital identification code for at least one of the microscope specimens by fingerprinting the microscope specimens using optical markers in at least one digital image of at least a part of the object.

17. The microscopy method as claimed in claim 16, comprising creating a plurality of different images of the microscope specimen.

18. The microscopy method as claimed in claim 16, wherein the identification code contains identification codes of a plurality of different images of the object.

19. The microscopy method as claimed in claim 16, wherein the digital identification code is calculated by machine learning.

20. The microscopy method as claimed in claim 19, wherein the digital identification code is calculated by means of a neural network and wherein the neural network is trained using a plurality of different images.

21. The microscopy method as claimed in claim 16, comprising:
processing the object;
creating at least one image of the processed object;
creating a digital identification code of the microscope specimen;
and/or
supplementing an existing digital identification code of the microscope specimen by fingerprinting the at least one image of the processed object using optical markers in the at least one image;
and/or
replacing an existing digital identification code of the microscope specimen by fingerprinting the at least one image of the processed object using optical markers to create a digital identification code.

22. The microscopy method as claimed in claim 16, comprising: using at least one optical marker to calculate a digital identification code as a position reference.

23. A non-transitory computer-readable medium having instructions stored thereon, which, upon execution by one or more processors, alone or in combination, provides for execution of the method according to claim 16.

24. A neural network for use with at least one microscope and for calculating a digital identification code, wherein the neural network is trained by digital identification codes which are calculated by the method as claimed in claim 16.

25. A digital identification code of an image of a microscope specimen, calculated by the method as claimed in claim 16.

* * * * *